United States Patent [19]

Schröder

[11] Patent Number: 4,638,699
[45] Date of Patent: Jan. 27, 1987

[54] SHEAR FOR PROFILE AND/OR FLAT AND/OR SOLID-SECTION STEEL STOCK

[76] Inventor: Werner Schröder, Auf dem Hahne 5, 5950 Finnentrop 1, Fed. Rep. of Germany

[21] Appl. No.: 771,364

[22] Filed: Aug. 30, 1985

[30] Foreign Application Priority Data

Sep. 5, 1984 [DE] Fed. Rep. of Germany ....... 3432672

[51] Int. Cl.⁴ ............................................ B23D 23/00
[52] U.S. Cl. ....................................... 83/452; 83/461; 83/466; 83/564; 269/71
[58] Field of Search ................. 83/452, 453, 461, 464, 83/466, 564; 269/71, 165

[56] References Cited

U.S. PATENT DOCUMENTS 4,236,430 12/1980 Hitt ................................. 83/452 X Primary Examiner—James M. Meister

[57] ABSTRACT

A shear for cutting profile and/or flat and/or solid-section steel has at least one vertical frame plate having a front face and a back face and formed with a through-going workpiece window, at least one fixed blade carried on the plate at the window, a working slide displaceable on the back face of the frame plate and carrying a movable blade passing past the fixed blade on movement of the slide on the frame plate, a generally flat holddown plate carrying a holddown element, and a pivot supporting the holddown plate on the frame plate for movement parallel to the frame plate and about a horizontal axis generally perpendicular to the frame plate between a raised position and a lowered position, and for movement also about a vertical axis between a use position lying against the front face of the frame plate and a service position extending transversely therefrom. Clamps secure the holddown plate in the use position against the frame plate with limited pivoting about the horizontal axis only. An actuator braced between the frame plate and the holddown plate in the use position of same pivots same limitedly about the horizontal axis and thereby presses the holddown element against a workpiece engaged through the window.

14 Claims, 4 Drawing Figures

SHEAR FOR PROFILE AND/OR FLAT AND/OR SOLID-SECTION STEEL STOCK

FIELD OF THE INVENTION

The present invention relates to a shear for profile and/or flat and/or solid-section steel stock. More particularly this invention concerns a heavy-duty such shear of the multipurpose type.

BACKGROUND OF THE INVENTION

A standard shear has a frame normally formed of two massive plates formed with upper and lower horizontally throughgoing windows, the windows of the one plate being aligned with those of the other. These frames carry at each of these windows a respective abutment-forming fixed blade that has a shape corresponding to the type of workpiece being cut, that is flat for flat stock and shaped for profiled or solid-section stock. A working slide formed in line with the frame-plate windows with respective windows is vertically displaceable by means of a massive double-acting hydraulic ram between the two frame plates and in turn carries at each of the windows a blade that passes the respective fixed blade when the slide is dropped. Thus a workpiece to be cut is poked through the aligned windows at the appropriate station, and the actuator pushes down the slide to cut the workpiece between the respective blades. Such an arrangement is described in German patent documents Nos. 2,838,733, 2,838,735, and 2,940,635 and is sold under the trade name "Mubea Matic" by the assignee of the instant application.

Furthermore it is possible in such a machine to provide a secondary angle slide carrying one of the movable blades, so that as the main slide descends the angle slide, which is destined to cut upright profile material, moves at about 45° to the vertical. Finally, it is also known to provide a puncher, riveter, or the like on the shear as described in application No. 193,670 filed Oct. 3, 1980 now U.S. Pat. No. 4,369,907, and marketed as a Mubea-Matic KBL 1300, so as to get the maximum versatility out of this big piece of equipment.

A holddown is provided on these machines to retain the workpieces in place against the respective fixed blades before the cut. This device has various adjustable parts that can be set to press the workpiece tightly against the fixed blade. Unfortunately such devices take up quite some room on the machine right around the critical blade area. When a blade must be changed it is therefore necessary to painstakingly remove the holddown system to gain access to the blades, and to laboriously remount it when the servicing is completed, something that is particularly onerous for a short workpiece run.

OBJECTS OF THE INVENTION

It is therefore an object of the present invention to provide an improved multipurpose shear.

Another object is the provision of such a multipurpose shear which overcomes the above-given disadvantages, that is whose blades are easy to change.

SUMMARY OF THE INVENTION

A shear for cutting profile and/or flat and/or solid-section steel has at least one vertical frame plate, at least one fixed blade carried on the plate, a working slide displaceable on the frame plate and carrying a movable blade passing past the fixed blade on movement of the slide on the frame plate, and a holddown engageable between a workpiece and the frame for pressing the workpiece against the fixed blade. According to this invention this shear has a pivot permitting pivotal displacement of the holddown on the frame, in particular about a first vertical axis parallel to the plate and a second horizontal axis generally perpendicular thereto.

Thus it is possible according to this invention to pivot the holddown out of the way to service the machine. Blades can therefore be replaced without complexly dismantling a complicated holddown setup.

The pivot according to this invention includes a vertical pivot pin seated in the frame and a horizontal pivot pin connected between the vertical pivot pin and the holddown. In addition a hydraulic actuator is braced between the frame and the holddown for pivoting same about the horizontal axis on the frame. Springs engaging this actuator normally lift the holddown out of contact with the workpiece, so that the actuator must be pressurized to clamp a workpiece against an abutment on itself or on the frame.

In order that the holddown can further be easily moved out of the way, the holddown and piston rod of the actuator are provided with complementary fittings that having an interfitting projection and recess that fit together for joint movement tangentially of the horizontal axis, but that can freely interengage and disengage when the holddown pivots about the vertical axis. Thus when the holddown is pivoted into the use position against the frame plate, the fittings automatically engage and couple the holddown to the actuator.

The holddown is normally a plate provided with various holddown fittings such as for flat workpieces with a bar with an edge that is movable between an upper position inclined to the horizontal and a lower horizontal position on pivoting of the holddown about the horizontal axis. Threaded holddown screws are also normally employed to cooperate with abutments that also can be carried on the holddown, or that are carried on the frame plate.

In other words, the system of this invention has at least one vertical frame plate having a front face and a back face and formed with a throughgoing workpiece window, at least one fixed blade carried on the plate at the window, a working slide displaceable on the back face of the frame plate and carrying a movable blade passing past the fixed blade on movement of the slide on the frame plate, a generally flat holddown plate carrying a holddown element, and a pivot supporting the holddown plate on the frame plate for movement parallel to the frame plate and about a horizontal axis generally perpendicular to the frame plate between a raised position and a lowered position, and for movement also about a vertical axis between a use position lying against the front face of the frame plate and a service position extending transversely therefrom. Clamps secure the holddown plate in the use position against the frame plate with limited pivoting about the horizontal axis only. An actuator braced between the frame plate and the holddown plate in the use position of same pivots same limitedly about the horizontal axis and thereby presses the holddown element against a workpiece engaged through the window.

DESCRIPTION OF THE DRAWING

The above and other features and advantages will become more readily apparent from the following, reference being made to the accompanying drawing in which.

SPECIFIC DESCRIPTION

Figure 1:
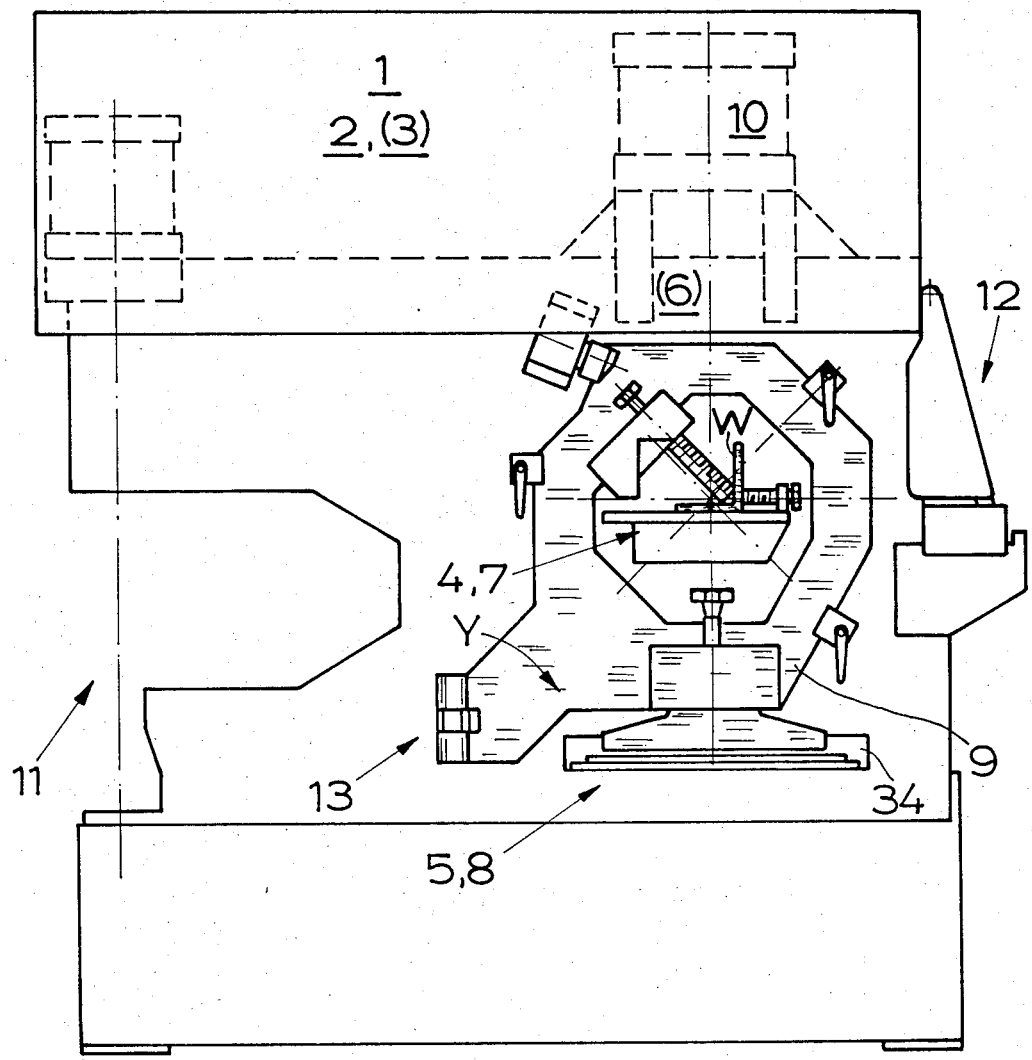
FIG. 1 is a small-scale view of the shear according to this invention.

As seen in FIG. 1a shear for cutting profiled, flat, or solid steel stock has a frame 1 formed by two plates 2 and 3 and having two vertically spaced fixed blades 4 and 5, a work slide 6, two vertically spaced blades 7 and 8 movable by the slide 6, and a holddown 9. A punch 11 and a notching device 12 are also provided on the frame 1.

The combined shear according to this invention comprises an upper shear for profile steel stock comprising the fixed blade 4 and the movable blade 7, and a shear for flat stock comprising the fixed blade 5 and the movable blade 8. The blade 7 is made to move diagonally at 45° across the respective blade 4 by means described in more detail in copending application 770,684 filed Aug. 29, 1985 by R. Muhr et al. Both shearing stations, respectively for profile and flat stock, share a single work slide 6 and a single drive or actuator 10 for this slide 6, that is both movable blades 7 and 8 are carried on the slide 6.

The holddown 9, which here is formed as a thick generally P-shaped plate, is mounted via a double pivot 13 on the front plate 2 of the frame 1 so it can move in two orthogonal planes. More specifically, this holddown 9 can pivot about the vertical axis of a vertical pivot pin 14 (FIG. 2), or about the horizontal axis of a horizontal pivot pin 15, which itself extends perpendicular to the frame 1 and normally parallel to a workpiece W engaged in the shear.

Figure 2:
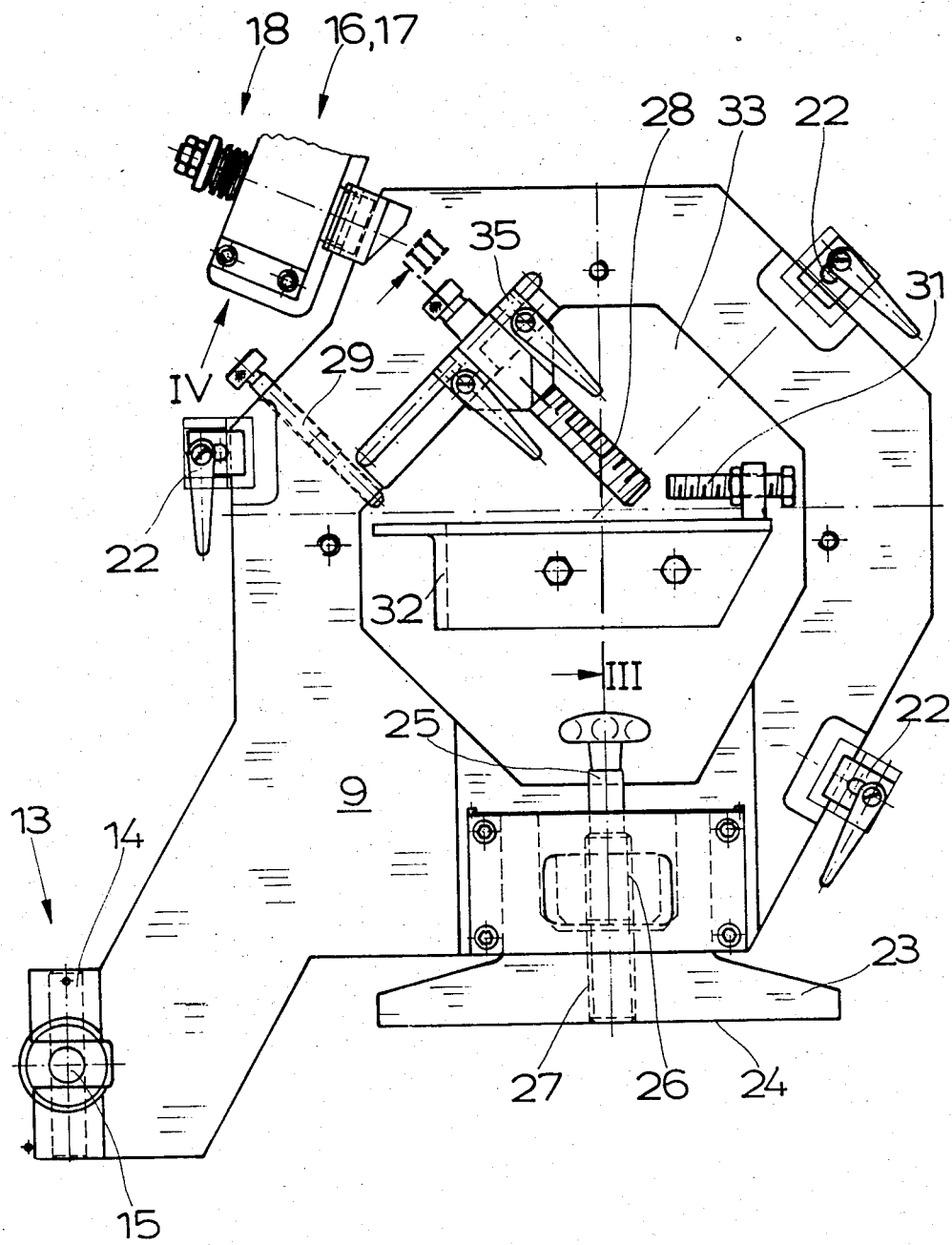
FIG. 2 is a larger-scale view of the holddown of the shear of FIG. 1.

In normal use the P-shaped holddown 9 is retained against the front plate 2 by three clamps 22 spaced as shown in FIG. 2 around the upper profile-workpiece window 33. These clamps 22 permit the holddown 9 to pivot limitedly about the horizontal axis 15, but not at all about the vertical axis 14.

Figure 3:
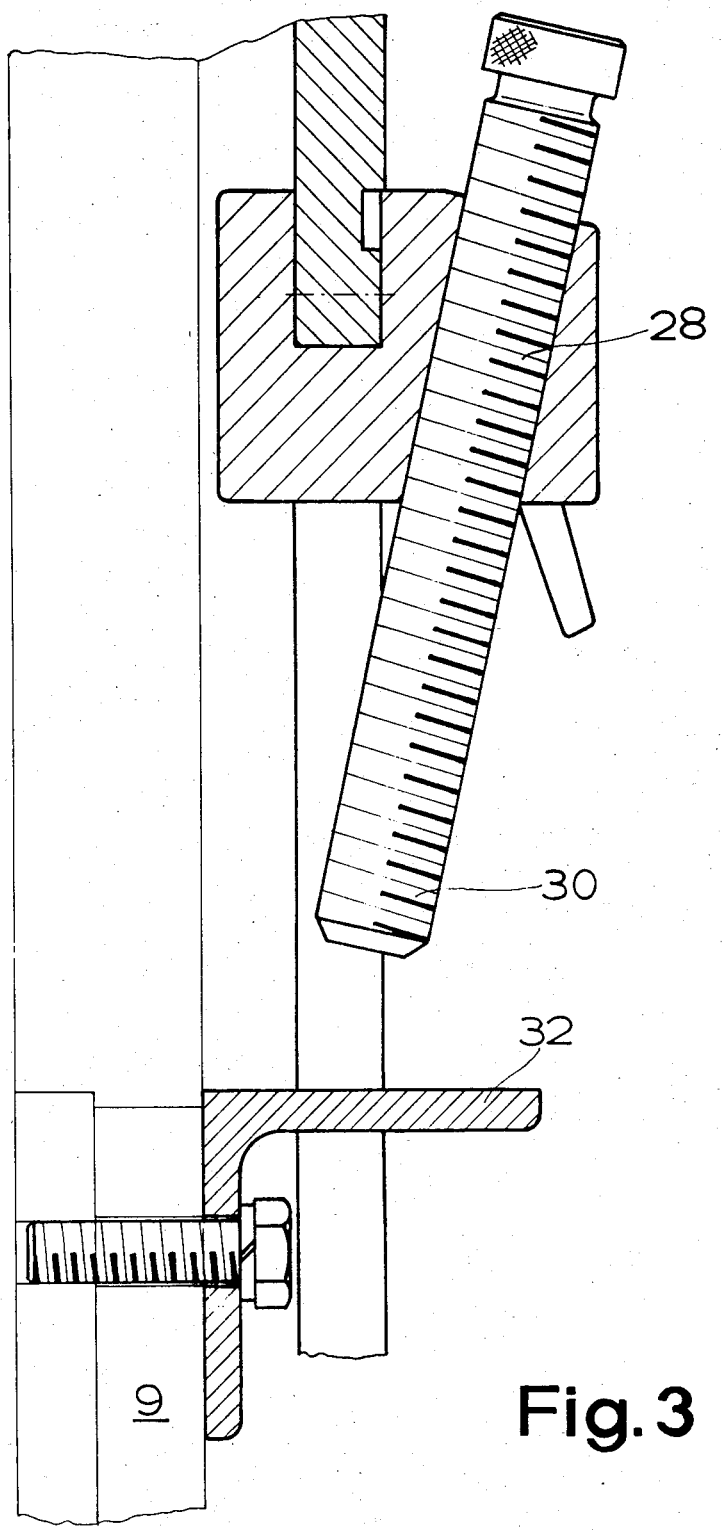
FIG. 3 is a large-scale section taken along line III—III of FIG. 2.

A workpiece W engaged in the upper window 33 normally sits atop the blade 4 as well as atop an angle-iron abutment 32. The holddown 9 is provided with a holddown screw 28 having an inner end 30 (FIG. 3 also) engageable with a workpiece on the support abutment 32, and in fact this screw 28 is inclined to the plane of movement of the blades 7 and 8 so that its end 30 can be as close as possible to the cutting location. This screw 28 is in turn carried on a small slide 35 on the holddown for diagonal movement perpendicular to the movement of the angle blade 7.

Another abutment screw 31 is provided carried on the abutment 32 to engage the back or web of a profile workpiece. A screw 29 on the far side of the holddown 9 can serve to hold large flat workpieces or wide flanges down in the machine.

The holddown 9 also carries a flat-workpiece clamp bar 23 having an edge 24 exposed in the lower flat-workpiece windows 34. This bar 23 is carried on the right-hand thread 27 of a spindle 25 also having a left-hand thread engaged in the holddown 9. Thus rotation of the spindle 25 adjusts the position of this lower holddown element 23.

Figure 4:
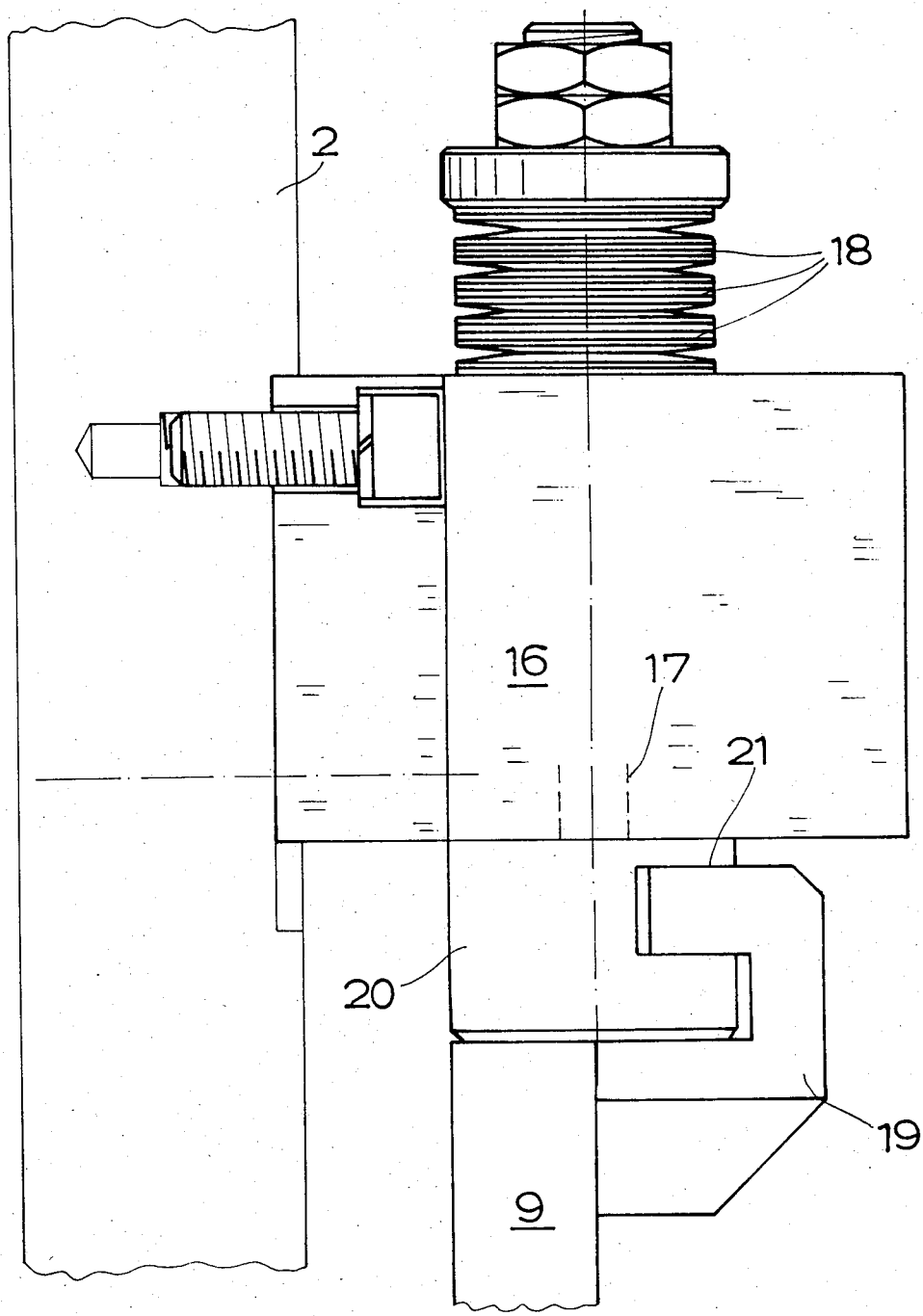
FIG. 4 is a large-scale view of the detail indicated at IV in FIG. 2.

A single-acting hydraulic ram 16 has a piston rod 17 provided on its outer end as seen in FIG. 4 with a fitting 20 formed with a recess 21 into which is engaged another fitting carried on the holddown 9. This piston rod 17 moves tangentially of a cylinder centered on the horizontal pivot axis 15 and is urged away from the holddown by a spring setup constituted of a stack of belleville washers 18. The ram 16 is pressurized to press the holddown 9 down, clockwise about the axis 15 as seen in FIG. 2, and when depressurized the springs 18 lift it back up.

Thus for use a workpiece is set in the machine and whichever holddown screw or bar is being used is manually adjusted so it is just a little above it. Then just before the actuator 10 is operated to drop the slide 6 and cut the workpiece, the cylinder 16 is automatically pressurized to clamp the workpiece tightly in place.

To service the machine, typically by replacing one of the blades, one need merely open up the three clamps 22 and pivot the entire holddown 9 out of the way about the vertical axis 14. The fittings 19 and 20 will automatically disengage. In this position free access is gained to the entire blade area of the machine. Once the servicing is completed, the holddown plate 9 is swung back against the front face of the front plate 2, secured by the hand clamps 22, and the shear is ready for use.

I claim:

1. In a shear for cutting profile and/or flat and/or solid-section steel and comprising:
   at least one vertical frame plate;
   at least one fixed blade carried on the plate;
   a working slide displaceable on the frame plate and carrying a movable blade passing past the fixed blade on movement of the slide on the frame plate; and
   means including a holddown engageable between a workpiece and the frame for pressing the workpiece against the fixed blade, the improvement comprising
   pivot means defining for the holddown on the frame a first vertical axis parallel to the plate and a second horizontal axis generally perpendicular thereto for pivotal displacement of the holddown on the frame.

2. The shear defined in claim 1 wherein the pivot includes a vertical pivot pin seated in the frame and a horizontal pivot pin connected between the vertical pivot pin and the holddown.

3. The shear defined in claim 1, further comprising a hydraulic actuator braced between the frame and the holddown for pivoting same about the horizontal axis on the frame.

4. The shear defined in claim 2, further comprising spring means operatively engaged between the actuator and the frame.

5. The shear defined in claim 4 wherein the actuator has a piston rod and the spring means is a stack of belleville washers carried on the rod, braced between it and the frame, and urging the holddown upward.

6. The shear defined in claim 3 wherein the actuator and holddown are provided with complementary fittings that having an interfitting projection and recess that fit together for joint movement tangentially of the horizontal axis, but that can freely interengage and disengage when the holddown pivots about the vertical axis.

7. The shear defined in claim 1, further comprising clamp means for securing the holddown against the frame plate for movement only angularly of the horizontal axis.

8. The shear defined in claim 1 wherein the holddown is provided with a holddown bar with an edge that is movable between an upper position inclined to the horizontal and a lower horizontal position on pivoting of the holddown about the horizontal axis.

9. The shear defined in claim 8 wherein the holddown has a compound screw connected to the bar for displacing and adjusting the position of same.

10. The shear defined in claim 1 wherein the holddown is provided with at least one threaded holddown screw.

11. The shear defined in claim 10 wherein the holddown screw forms a very acute angle with the vertical.

12. The shear defined in claim 10 wherein the holddown screw is horizontal.

13. The shear defined in claim 1 wherein the holddown is provided with a horizontal workpiece support.

14. A shear for cutting elongated steel stock, the shear comprising:

at least one vertical frame plate having a front face and a back face and formed with a throughgoing workpiece window;

at least one fixed blade carried on the plate at the window;

a working slide displaceable on the back face of the frame plate and carrying a movable blade passing past the fixed blade on movement of the slide on the frame plate;

a holddown element;

a generally flat holddown plate carrying the holddown element;

pivot means supporting the holddown plate on the frame plate for movement parallel to the frame plate and about a horizontal axis generally perpendicular to the frame plate between a raised position and a lowered position, and for movement also about a vertical axis between a use position lying against the front face of the frame plate and a service position extending transversely therefrom;

clamp means for securing the holddown plate in the use position against the frame plate with limited pivoting about the horizontal axis only; and means including an actuator braced between the frame plate and the holddown plate in the use position of same for pivoting same limitedly about the horizontal axis and thereby pressing the holddown element against a workpiece engaged through the window.

* * * * *